US010574950B2

(12) United States Patent
Watanabe

(10) Patent No.: US 10,574,950 B2
(45) Date of Patent: Feb. 25, 2020

(54) WAVELENGTH CONVERSION DEVICE, LIGHT SOURCE DEVICE, LIGHTING APPARATUS, AND PROJECTION IMAGE DISPLAY APPARATUS

(71) Applicant: PANASONIC INTELLECTUAL PROPERTY MANAGEMENT CO., LTD., Osaka (JP)

(72) Inventor: Kenta Watanabe, Osaka (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 24 days.

(21) Appl. No.: 15/947,320

(22) Filed: Apr. 6, 2018

(65) Prior Publication Data

US 2018/0302599 A1 Oct. 18, 2018

(30) Foreign Application Priority Data

Apr. 14, 2017 (JP) ................................. 2017-080872

(51) Int. Cl.
*H04N 9/31* (2006.01)
*G03B 21/20* (2006.01)
(Continued)

(52) U.S. Cl.
CPC ....... *H04N 9/3161* (2013.01); *G02B 27/0905* (2013.01); *G02B 27/0955* (2013.01);
(Continued)

(58) Field of Classification Search
CPC .............. H04N 9/3161; G02B 27/0905; G02B 27/0955; G02B 27/286; G02B 27/0961; G03B 21/2033; C09K 11/665
(Continued)

(56) References Cited

U.S. PATENT DOCUMENTS 9,785,039 B2 10/2017 Motoya et al.
2006/0022582 A1* 2/2006 Radkov ................ C09K 11/665
313/503

(Continued)

FOREIGN PATENT DOCUMENTS

CN 101294693 A * 10/2008 .............. F21V 19/00
JP 2003-255320 A 9/2003
(Continued)

OTHER PUBLICATIONS

Machine Translation of CN 101294693 A (Year: 2008).*

*Primary Examiner* — Jerry L Brooks
(74) *Attorney, Agent, or Firm* — Greenblum & Bernstein, P.L.C.

(57) ABSTRACT

A wavelength conversion device includes: a substrate; and a phosphor layer on the substrate. The phosphor layer includes: a base material; and a first phosphor and a second phosphor each of which emits fluorescent light when excited by excitation light. Where chromaticity coordinates of the fluorescent light emitted by the first phosphor and chromaticity coordinates of the fluorescent light emitted by the second phosphor are (x1, y1) and (x2, y2), respectively, $-0.02 \leq x1-x2 \leq 0.02$ and $-0.02 \leq y1-y2 \leq 0.02$ are satisfied. A peak wavelength of an excitation spectrum of the first phosphor is different from a peak wavelength of an excitation spectrum of the second phosphor.

11 Claims, 6 Drawing Sheets

(51) Int. Cl.
*G02B 27/09* (2006.01)
*G02B 27/28* (2006.01)
*G03B 21/16* (2006.01)

(52) U.S. Cl.
CPC ......... *G02B 27/286* (2013.01); *G03B 21/204* (2013.01); *G03B 21/2033* (2013.01); *H04N 9/3158* (2013.01); *G02B 27/0961* (2013.01); *G03B 21/16* (2013.01)

(58) Field of Classification Search
USPC .............................................. 353/31; 313/503
See application file for complete search history.

(56) References Cited

U.S. PATENT DOCUMENTS

| | | | |
|---|---|---|---|
| 2007/0262339 A1 | 11/2007 | Hussell et al. | |
| 2008/0122343 A1 | 5/2008 | Maruyama et al. | |
| 2012/0133851 A1* | 5/2012 | Suga | G02B 27/283 349/9 |
| 2013/0234622 A1 | 9/2013 | Tanaka et al. | |
| 2015/0116671 A1* | 4/2015 | Kuroi | C09K 11/02 353/84 |
| 2015/0166888 A1* | 6/2015 | Katsumoto | C09K 11/7774 252/301.4 R |
| 2015/0316839 A1* | 11/2015 | Jeoung | G03B 21/204 353/20 |
| 2017/0315431 A1* | 11/2017 | Schnarrenberger | G03B 21/2066 |
| 2018/0112128 A1 | 4/2018 | Watanabe | |

FOREIGN PATENT DOCUMENTS

| | | |
|---|---|---|
| JP | 2008-135537 A | 6/2008 |
| JP | 2011-070088 A | 4/2011 |
| JP | 2012-044206 A | 3/2012 |
| JP | 2013-214735 A | 10/2013 |

* cited by examiner

WAVELENGTH CONVERSION DEVICE, LIGHT SOURCE DEVICE, LIGHTING APPARATUS, AND PROJECTION IMAGE DISPLAY APPARATUS

CROSS REFERENCE TO RELATED APPLICATION

This application claims the benefit of priority of Japanese Patent Application Number 2017-080872 filed on Apr. 14, 2017, the entire content of which is hereby incorporated by reference.

BACKGROUND

1. Technical Field

The present disclosure relates to a wavelength conversion device that emits light when illuminated with excitation light. In addition, the present disclosure relates to a light source device, a lighting apparatus, and a projection image display apparatus that include such a wavelength conversion device.

2. Description of the Related Art

In recent years, a light source device has been proposed in which a solid-state light-emitting element that emits laser light and a wavelength conversion device including phosphors are combined. Patent Literature (PTL) 1 (Japanese Unexamined Patent Application Publication No. 2011-70088) discloses a light source device for projector that includes, as the above wavelength conversion device, a phosphor wheel.

SUMMARY

In a wavelength conversion device, a variation in the emission peak wavelength of excitation light with which the wavelength conversion device is illuminated greatly changes the chromaticity of light emitted from the wavelength conversion device.

The present disclosure provides a wavelength conversion device capable of reducing the influence of a variation in the emission peak wavelength of excitation light on the chromaticity of emitted light. In addition, the present disclosure provides a light source device, a lighting apparatus, and a projection image display apparatus that include such a wavelength conversion device.

A wavelength conversion device according to one aspect of the present disclosure includes: a substrate; and a phosphor layer on the substrate. The phosphor layer includes: a base material; and a first phosphor and a second phosphor each of which emits fluorescent light when excited by excitation light. Where chromaticity coordinates of the fluorescent light emitted by the first phosphor and chromaticity coordinates of the fluorescent light emitted by the second phosphor are (x1, y1) and (x2, y2), respectively, $-0.02 \leq x1-x2 \leq 0.02$ and $-0.02 \leq y1-y2 \leq 0.02$ are satisfied. A peak wavelength of an excitation spectrum of the first phosphor is different from a peak wavelength of an excitation spectrum of the second phosphor.

A light source according to one aspect of the present disclosure includes; the wavelength conversion device; and an excitation light source that emits the excitation light. The light source device emits white light including the excitation light, the fluorescent light emitted by the first phosphor, and the fluorescent light emitted bye, the second phosphor.

A lighting apparatus according to one aspect of the present disclosure includes: the light source device; and an optical element that condenses or diffuses the white light emitted from the light source device.

A projection image display apparatus according to one aspect of the present disclosure includes: the light source device; an imaging element that modulates the white light emitted from the light source device, and outputs, as an image, the white light modulated and a projector lens that projects the image outputted by the imaging element.

According to the present disclosure, a wavelength conversion device is achieved that is capable of reducing the influence of a variation in the emission peak wavelength of excitation light on the chromaticity of emitted light. In addition, according to the present disclosure, a light source device, a lighting apparatus, and a projection image display apparatus are achieved that include such a wavelength conversion device.

BRIEF DESCRIPTION OF DRAWINGS

The figures depict one or more implementations in accordance with the present teaching, by way of examples only, not by way of limitations. In the figures, like reference numerals refer to the same or similar elements.

DETAILED DESCRIPTION OF THE EMBODIMENTS

Figure 1:
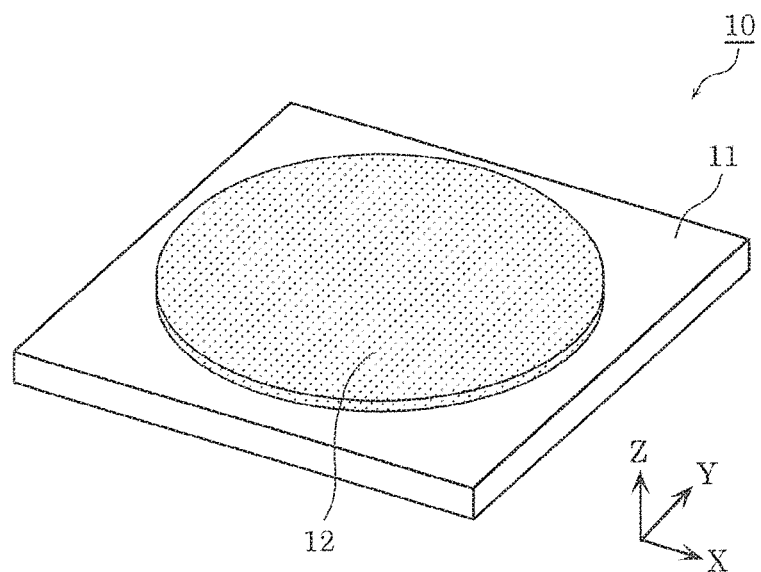
FIG. 1 is an external perspective view of a wavelength conversion device according to Embodiment 1.

Hereinafter, embodiments of the present disclosure will be described with reference to the drawing. It should be noted that each of the embodiments described below shows a general or specific example. Therefore, numerical values, shapes, materials, structural components, the arrangement and connection of the structural components, etc. indicated in the following embodiments are mere examples, and are not intended to limit the present disclosure. In addition, among the structural components in the following embodiments, structural components not, recited in any independent claim defining the most general concept are described as optional structural components.

It should be noted that the figures are schematic diagrams and are not necessarily precise illustrations. Furthermore, in the figures, substantially identical components are assigned the same reference signs, and overlapping description may be omitted or simplified.

Moreover, there are instances where coordinate axes are illustrated in the figures used to describe the following embodiments. The Z axis direction in the coordinate axes is, for example, the vertical direction the Z axis positive side is referred to as the top side (upward), and the Z axis negative side is referred to as the bottom side (downward). Stated differently, the Z axis direction is a direction perpendicular to a substrate included in a wavelength conversion device. Furthermore, the X axis direction and the Y axis direction are mutually orthogonal directions in a plane (horizontal plane) perpendicular to the Z axis direction. The X-Y plane is a plane parallel to a main surface of the substrate included in the wavelength conversion device. For example, in the following embodiments, the expression "in a plan view" means a view from the Z axis direction.

Embodiment 1

[Configuration of Wavelength Conversion Device]

Figure 2:
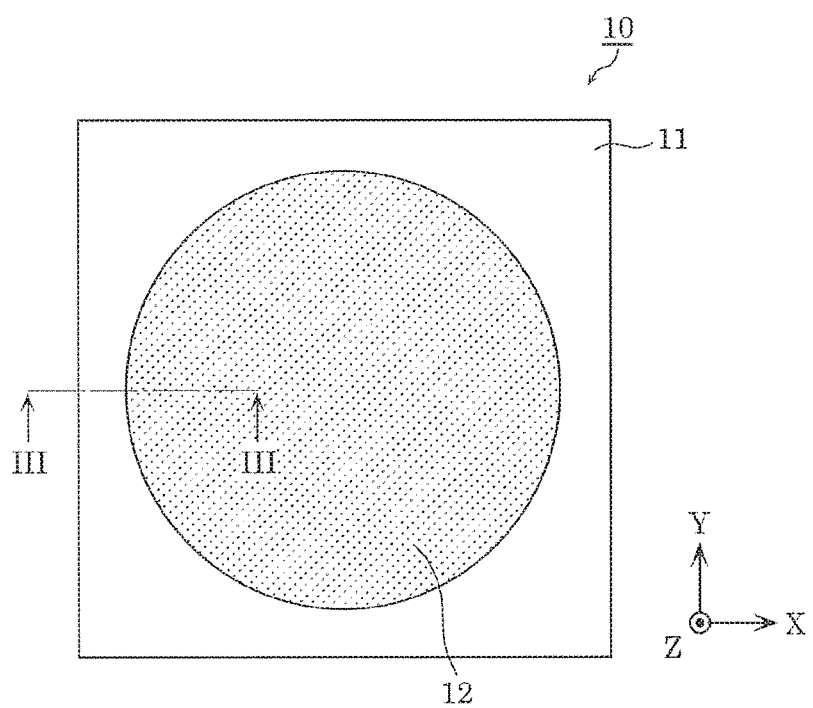
FIG. 2 is a plan view of the wavelength conversion device according to Embodiment 1.
Figure 3:
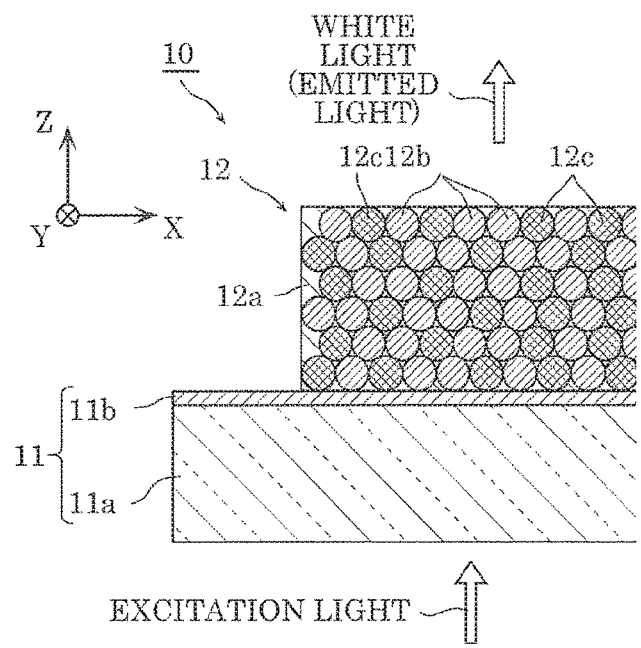
FIG. 3 is a schematic cross-sectional view of the wavelength conversion device according to Embodiment 1, taken along line III-III in FIG. 2.

First, the following describes a configuration of a wavelength conversion device according to Embodiment 1 with reference to the drawings. FIG. 1 is an external perspective view of the wavelength conversion device according to Embodiment 1. FIG. 2 is a plan view of the wavelength conversion device according to Embodiment 1. FIG. 3 is a schematic cross-sectional view of the wavelength conversion device according to Embodiment 1, taken along line III-III in FIG. 2. It should be rioted that, in FIG. 3, there are instances where a magnitude relationship of the thickness between structural components, for example, is not accurately described.

Wavelength conversion device 10 according to Embodiment illustrated in FIG. 1 to FIG. 3 is a device that emits fluorescent light when excited by excitation light. Specifically, wavelength conversion device 10 includes substrate 11 and phosphor layer 12, and emits fluorescent light when first phosphors 12b in phosphor layer 12 are excited by excitation light. In other words, wavelength conversion device 10 is a light-transmissive phosphor plate, converts a wavelength of a portion of blue laser light (excitation light) emitted by a laser light source into a wavelength of yellow fluorescent light, and emits the yellow fluorescent light. Wavelength conversion device 10 emits white light including blue laser light passing through phosphor layer 12, and the yellow fluorescent light emitted by first phosphors 12b. It should be noted that wavelength conversion device 10 may be a reflective phosphor plate or a phosphor wheel for use in a projection image display apparatus.

Substrates 11 is light-transmissive substrate. Specifically, substrate 11 includes substrate body 11a and dichroic mirror layer 11b.

Substrate body 11a is a plate that has a rectangular shape in a plan view, and has a first main surface on the Z axis positive side on which dichroic mirror layer 11b is disposed, and a second main surface on the Z axis negative side that is an incident surface for excitation light. Specifically, substrate body 11a is a sapphire substrate. Substrate body 11a may be any other light-transmissive substrate, such as a light-transmissive ceramic substrate made of polycrystalline, alumina or aluminum nitride, a transparent glass substrate, a quartz substrate, or a transparent resin substrate. Moreover, for example, when wavelength conversion device 10 is a reflective phosphor plate, substrate body 11a may be a non-light-transmissive substrate. Furthermore, substrate body 11a may have any other shape in a plan view, such as a circular shape.

Dichroic mirror layer 11b is a thin film having a property that transmits light of a blue wavelength region, and reflects light of a yellow wavelength region. In other words, dichroic mirror layer 11b has a property that transmits excitation light emitted by the laser light source, and reflects fluorescent light emitted by phosphor layer 12. With dichroic mirror layer 11b, it is possible to increase light emission efficiency of wavelength conversion device 10.

Phosphor layer 12 is disposed on substrate 11 (on dichroic mirror layer 11b). Although phosphor layer 12 has a circular shape in a plan-view, phosphor layer 12 may have any other shape such as a rectangular shape or ring shape. Phosphor layer 12 includes base material 12a, first phosphors 12b, and second phosphors 12c. Phosphor layer 12 is made by, for example, printing, on substrate 11, a paste formed of base material 12a including first phosphors 12b and second phosphors 12c. Phosphor layer 12 has a thickness of, for example, at least 60 μm and at most 100 μm.

Base material 12a is made of an inorganic material, such as glass, or an organic-inorganic hybrid material. Since base material 12a is made of an inorganic material, it is possible to increase a heat dissipation property of wavelength conversion device 10. Base material 12a has an of refractive index (hereinafter simply referred to as a refractive index) of, for example, at least 1.4 and at most 1.5. The refractive index of base material 12a is lower than a refractive index of first phosphors 12b and a refractive index of second phosphors 12c.

First phosphors 12b are dispersed in phosphor layer 12 (base material 12a), and emit light when excited by blue laser light emitted by the laser light source. In other words, first phosphors 12b emit fluorescent light when excited by excitation light. Specifically, first phosphors 12b are yttrium-aluminum-garnet (YAG) yellow phosphors such as $Y_3(Al, Ga)_5O_{12}$:Ce phosphors, and emit yellow fluorescent light. It should be noted that first phosphors 12b may be lutetium-aluminum-garnet (LuAG) yellow phosphors such as $Lu_3Al_5O_{12}$:Ce phosphors. It should be noted that yellow phosphors are, for example, phosphors having a fluorescent light peak wavelength of at least 540 nm and at most 600 nm. First phosphors 12b may be LuAG green phosphors or YAG green phosphors.

First phosphors 12b have a grain size (hereinafter, more specifically, a median size (d50) or mean diameter) of, for example, at least 5 μm and at most 20 μm. In addition, first phosphors 12b have an optical refractive index of, for example, at least 1.7 and at most 1.9.

Second phosphors 12c are dispersed in phosphor layer 12 (base material 12a), and emit light when excited by blue laser light emitted by the laser light source. In other words, second phosphors 12c emit fluorescent light when excited by excitation light. Specifically, second phosphors 12c are LuAG yellow phosphors such as $Lu_3Al_5O_{12}$:Ce phosphors. It should be noted that second phosphors 12c may be YAG yellow phosphors such as $Y_3(Al, Ga)_5O_{12}$:Ce phosphors. Second phosphors 12c may be LuAG green phosphors or YAG green phosphors.

Second phosphors 12c have a grain size of, for example, at least 5 μm and at most 20 μm. In addition, second phosphors 12c have an optical refractive index of, for example, at least 1.7 and at most 1.9.

Although the total amount (volume, or mass) of first phosphors 12b included in phosphor layer 12 is approximately equal to the total amount of second phosphors 12c included in phosphor layer 12, the former may be different from the latter.

Moreover, most of first phosphors 12b included in phosphor layer 12 are in direct contact with other first phosphors 12b or second phosphors 12c. The same applies to second phosphors 12c. As described above, since a densely packed state of the phosphors is held in wavelength conversion device 10, heat generated in one of the phosphors is easily conducted to the other phosphors. Accordingly, the heat dissipation property is increased.

It should be noted that as a result of keen examination, the inventors have found that phosphor layer 12 may contain first phosphors 12b and second phosphors 12c in a total volume of at least 30 vol % relative to base material 12a. In other words, when the volume of base material 12a is 100%, the sum of the volumes of all the phosphors included in phosphor layer 12 may be at least 30%. This makes it easy to dispose the phosphors densely in phosphor layer 12.

[Two Types of Phosphors]

In wavelength conversion device 10, keeping the chromaticity of white light emitted from wavelength conversion device 10 within a certain range is problematic. In particular, when excitation light is laser light, the excitation light has a high wavelength purity, and thus a variation in the emission peak wavelength of the excitation light is likely to result in a variation in the chromaticity of the white light.

In order to reduce the variation in the chromaticity of the white light, in wavelength conversion device 10, phosphor layer 12 includes two types of phosphors (first phosphors 12b and second phosphors 12c) each of which emits yellow fluorescent light having almost identical chromaticity (substantially the same chromaticity). Specifically, where the chromaticity coordinates of the fluorescent light emitted by first phosphors 12b and the chromaticity coordinates of the fluorescent light emitted by second phosphors 12c are (x1, y1) and (x2, y2), respectively, $-0.02 \leq x1-x2 \leq 0.02$ and $-0.02 \leq y1-y2 \leq 0.02$ are satisfied. In order to further reduce a difference between the chromaticity of first phosphors 12b and the chromaticity of second phosphors 12c, the chromaticity coordinates (x1, y1) of the fluorescent light emitted by first phosphors 12b and the chromaticity coordinates (x2, y2) of the fluorescent light emitted by second phosphors 12c may satisfy $-0.003 \leq x1-x2 \leq 0.003$ and $-0.003 \leq y1-y2 \leq 0.003$. The chromaticity coordinates of the fluorescent light emitted by first phosphors 12b and the chromaticity coordinates of the fluorescent light emitted by second phosphors 12c may be the same. It should be noted that the term chromaticity coordinates means coordinates on the xy chromaticity diagram of the CIE color system.

Moreover, each of the two types of phosphors has a different peak wavelength of an excitation spectrum. In other words, the peak wavelength of the excitation spectrum of first phosphors 12b is different from the peak wavelength of the excitation spectrum of second phosphors 12c. For example, the peak wavelength of the excitation spectrum of first phosphors 12b is different from the peak wavelength of the excitation spectrum of second phosphors 12c by at least 3 nm.

Figure 4:
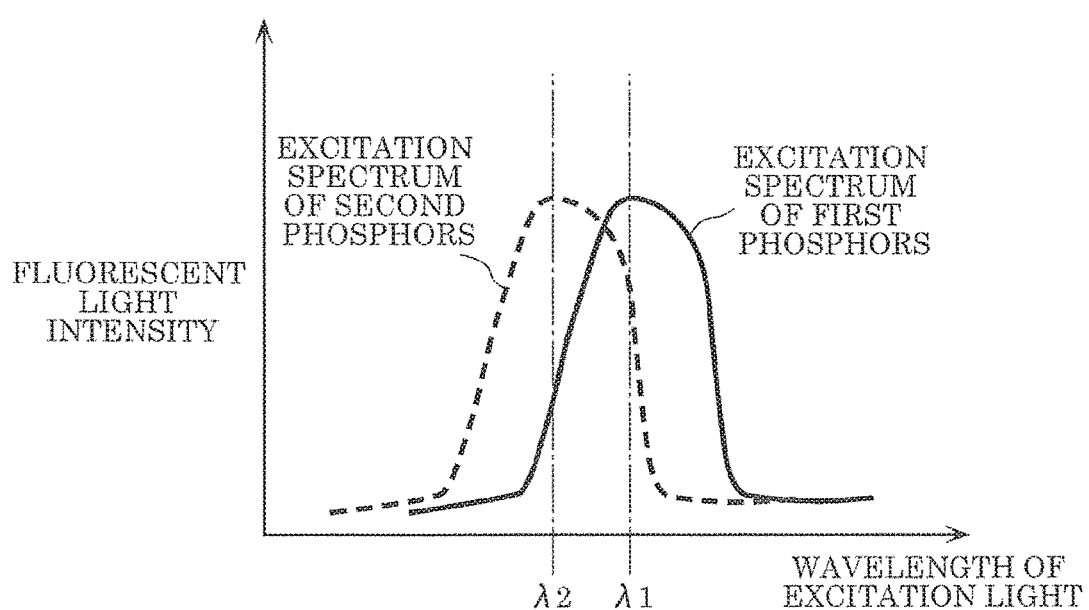
FIG. 4 is a graph illustrating an excitation spectrum of first phosphors and an excitation spectrum of second phosphors.

The following describes an effect produced by phosphor layer 12 including first phosphors 12b and second phosphors 12c, with reference to FIG. 4. FIG. 4 is a graph illustrating an excitation spectrum of first phosphors 12b and an excitation spectrum of second phosphors 12c.

In FIG. 4, the excitation spectrum of first phosphors 12b and the excitation spectrum of second phosphors 12c are indicated by a solid line and a broken line, respectively. An excitation spectrum indicates a relationship between an emission peak wavelength of excitation light with which phosphors are illuminated, and an intensity of fluorescent light emitted from the phosphors when illuminated with the excitation light.

For example, when phosphor layer 12 includes only first phosphors 12b, it follows that the chromaticity (color temperature) of white light in a first state in which an emission peak wavelength of excitation light is the same as peak wavelength $\lambda 1$ of the excitation spectrum of first phosphors 12b is greatly different from the chromaticity (color temperature) of white light in a second state in which the emission peak wavelength of the excitation light is shifted more toward a short wavelength side than toward peak wavelength $\lambda 1$. Specifically, in the second state, the blue components of the white light emitted from phosphor layer 12 become relatively greater than the yellow components of the white light because the fluorescent light intensity of first phosphors 12b is reduced, and thus the white light in the second becomes more bluish and has a higher color temperature than the white light in the first state.

In contrast, when phosphor layer 12 includes first phosphors 12b and second phosphors 12c, it follows that an effective excitation spectrum of phosphor layer 12 is a combination of the excitation spectrum of first phosphors 12b and the excitation spectrum of second phosphors 12c. In this case, the effective excitation spectrum of phosphor layer 12 has a blunter peak than when phosphor layer 12 includes only first phosphors 12b, and thus the influence of the variation in the emission peak wavelength of the excitation light on the chromaticity of the white light is reduced.

For example, when phosphor layer 12 includes first phosphors 12b and second phosphors 12c, the fluorescent light intensity of first phosphors 12b in the second state is lower than that in the first state, whereas the fluorescent light intensity of second phosphors 12c in the second state is higher than that in the first state. Accordingly, first phosphors 12b and second phosphors 12c emit fluorescent light having almost identical chromaticity, and thus a difference between the chromaticity of the white light in the first state and the chromaticity of the white light in the second state is reduced.

As described above, since phosphor layer 12 includes the two types of phosphors, each of which emits the fluorescent light having the almost identical chromaticity and has the different peak wavelength of the excitation spectrum, it is possible to reduce the influence of the variation in the emission peak wavelength of the excitation light on the chromaticity of the white light.

It should be noted that the variation in the chromaticity of the white light is effectively reduced when a central value of the variation in the emission peak wavelength of the excitation light is greater than peak wavelength $\lambda 2$ of the excitation spectrum of second phosphors 12c and less than peak wavelength $\lambda 1$ of the excitation spectrum of first, phosphors 12b. In other words, the variation in the chromaticity of the white light is effectively reduced when peak wavelength $\lambda 1$ of the excitation spectrum of first phosphors 12b is longer than the emission peak wavelength of the excitation light, an peak wavelength $\lambda 2$ of the excitation spectrum of second phosphors 12c is shorter than the emission peak wavelength of the excitation light. It should be noted that peak wavelength $\lambda 1$ and peak wavelength $\lambda 2$ are, for example, 460 nm and 440 nm, respectively.

Moreover, in a wavelength region of at least $\lambda 2$ and at most $\lambda 1$, the fluorescent light intensity increases with an increase in the wavelength of the excitation light in the excitation spectrum of first phosphors 12b, and the fluorescent light intensity decreases with an increase in the wavelength of the excitation light in the excitation spectrum of second phosphors 12c. It is possible to effectively reduce the variation in the chromaticity of the white light by such a wavelength region including the emission peak wavelength of the excitation light.

(Variations)

As stated above, one of the two types of first phosphors 12b and second phosphors 12c (first phosphors 12b in Embodiment 1) is a type of YAG yellow phosphor, and another of the two types of first phosphors 12b and second phosphors 12c (second phosphors 12c in Embodiment 1) is a type of LuAG yellow phosphor. The two types of phosphors, each of which emits the fluorescent light having the almost identical chromaticity and has the different peak wavelength of the excitation spectrum, are, for example, two types of phosphors each of which is made of a different material, but may be two types of phosphors in which host crystals are made of the same principal constituent material and each of which has a different composition of a substitution element or activator material. Specifically, first phosphors 12b and second phosphors 12c may be both YAG phosphors but may differ in the composition of the substitution element or activator material. First phosphors 12b and second phosphors 12c may be both LuAG phosphors but may differ in the composition of the substitution element or activator material.

Moreover, phosphor layer 12 may include red phosphors such as $CaAlSiN_3$:Eu phosphors or $(Sr, Ca)AlSiN_3$:Eu phosphors, in addition to first phosphors 12b and second phosphors 12c that are the yellow phosphors. It should be noted that the red phosphors are, for example, phosphors having a fluorescent light peak wavelength of at least 600 nm and at most 750 nm. Since the red phosphors are further included as above, it is possible to increase the color rendering property of wavelength conversion device 10.

Furthermore, first phosphors 12b and second phosphors 12c are not limited to the yellow phosphors. Where the chromaticity coordinates of the fluorescent light emitted by first phosphors 12b and the chromaticity coordinates of the fluorescent light emitted by second phosphors 12c are (x1, y1) and (x2, y2), respectively, $-0.02 \leq x1-x2 \leq 0.02$ and $-0.02 \leq y1-y2 \leq 0.02$ may be satisfied.

For example, first phosphors 12b and second phosphors 12c may be green phosphors. In other words, phosphor layer 12 may include two types of green phosphors each of which emits fluorescent light having almost identical chromaticity and has a different wavelength of an excitation spectrum. It should be noted that the green phosphors are, for example, phosphors having a fluorescent light peak wavelength of at least 480 nm and at most 540 nm.

In this case, phosphor layer 12 includes first phosphors 12b and second phosphors 12c, the green phosphors, in addition to the red phosphors, and the white light is achieved by combining blue excitation light, green fluorescent light, and red fluorescent light.

Moreover, first phosphors 12b and second phosphors 12c may be red phosphors. In other words, phosphor layer 12 may include two types of red phosphors each of which emits fluorescent light having almost identical chromaticity and has a different wavelength of an excitation spectrum. In this case, phosphor layer 12 includes the yellow phosphors (or the green phosphors) in addition to first phosphors 12b and second phosphors 12c, the red phosphors, and the white light is achieved by combining blue excitation light, red fluorescent light, and yellow fluorescent light (or green fluorescent light).

Furthermore, phosphor layer 12 may include at least two types of phosphors each of which emits fluorescent light having almost identical chromaticity and has a different peak wavelength of an excitation spectrum. In other words, phosphor layer 12 may include three or more types of phosphors each of which emits fluorescent light having almost identical chromaticity and has a different peak wavelength of an excitation spectrum.

(Advantageous Effects Etc.)

As described above, wavelength conversion device 10 includes: substrate 11; and phosphor layer 12 on substrate 11. Phosphor layer 12 includes: base material 12a; and first phosphor 12b and second phosphor 12c each of which emits fluorescent light when excited by excitation light. Where chromaticity coordinates of the fluorescent light emitted by first phosphor 12b and chromaticity coordinates of the fluorescent light emitted by second phosphor 12c are (x1, y1) and (x2, y2), respectively, $-0.02 \leq x1-x2 \leq 0.02$ and $-0.02 \leq y1-y2 \leq 0.02$ are satisfied. A peak wavelength of an excitation spectrum of first phosphor 12b is different from a peak wavelength of an excitation spectrum of second phosphor 12c.

With this, it is possible to reduce the influence of a variation in emission peak wavelength of the excitation light on chromaticity of light emitted from wavelength conversion device 10.

Moreover, the peak wavelength of the excitation spectrum of first phosphor 12b may be different from the peak wavelength of the excitation spectrum of second phosphor 12c by at least 3 nm.

Since phosphor layer 12 includes first phosphor 12b and second phosphor 12c differing in the peak wavelength of the excitation spectrum by at least 3 nm, it is possible to reduce the influence of the variation in emission peak wavelength of the excitation light on the chromaticity of the light emitted from wavelength conversion device 10.

Moreover, the peak wavelength of the excitation spectrum of first phosphor 12b may be longer than an emission peak wavelength of the excitation light, and the peak wavelength of the excitation spectrum of second phosphor 12c may be shorter than the emission peak wavelength of the excitation light.

With this, it is possible to effectively reduce a variation in chromaticity of light emitted from wavelength conversion device 10.

Moreover, one of first phosphor 12b and second phosphor 12c maybe a YAG phosphor that emits yellow fluorescent light, and another of first phosphor 12b and second phosphor 12c may be a LuAG phosphor that emits yellow fluorescent light.

With this, the phosphors of two types made of different materials make it possible to reduce the influence of the variation in emission peak wavelength of the excitation light on the chromaticity of the light emitted from wavelength conversion device 10.

Moreover, phosphor layer 12 may include first phosphor 12b and second phosphor 12c in a volume of at least 30 vol % relative to base material 12a.

With this, it is possible to dispose the phosphors densely in phosphor layer 12, which makes it easy to increase a heat dissipation property.

Embodiment 2

[Entire Configuration]

Figure 5:
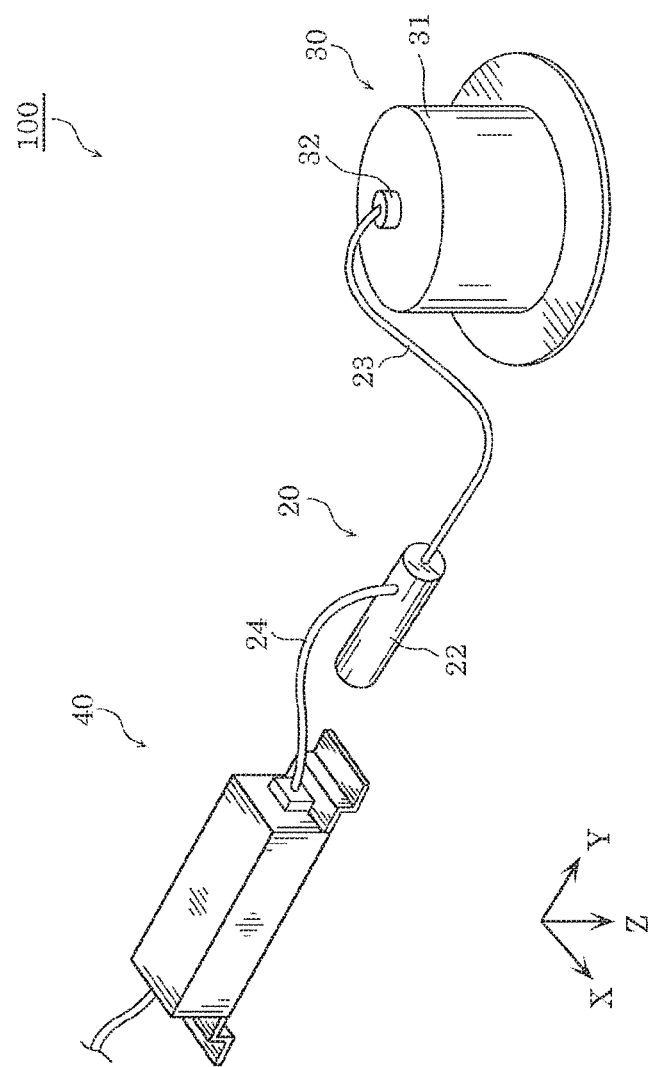
FIG. 5 is an external perspective view of a lighting apparatus according to Embodiment 2.
Figure 6:
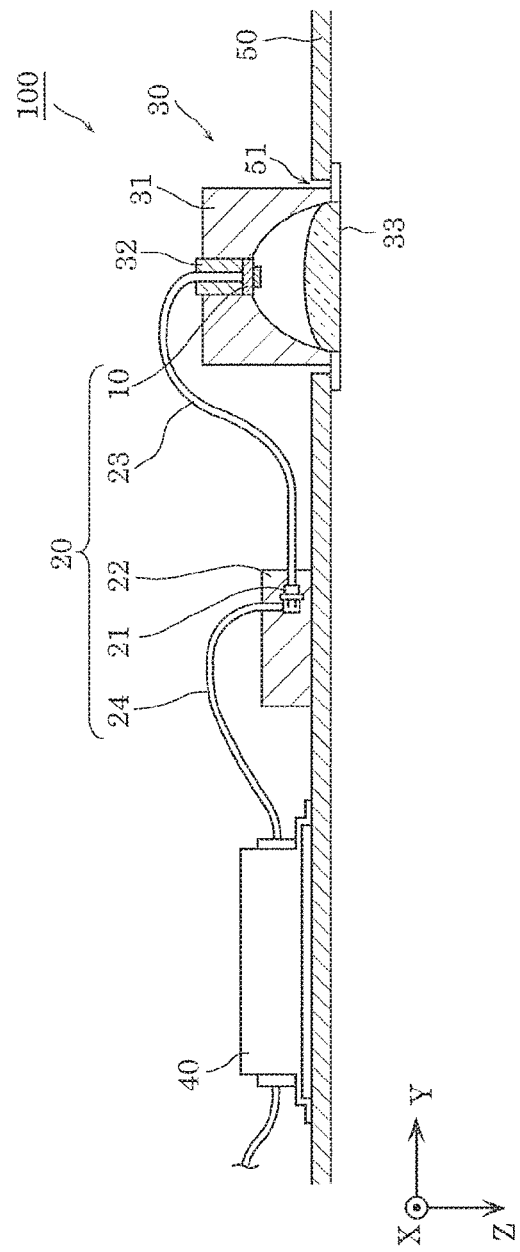
FIG. 6 is a schematic cross-sectional view illustrating usage of the lighting apparatus according to Embodiment 2.

In Embodiment 2, a light source device including wavelength conversion device 10, and a lighting apparatus including the light source device will be described. FIG. 5 is an external perspective view of the lighting apparatus according to Embodiment 2. FIG. 6 is a schematic cross-sectional view illustrating usage of the lighting apparatus according to Embodiment 2. It should be noted that regarding only power supply device 40, FIG. 6 shows not a cross-sectional surface but a side surface.

As illustrated in FIG. 5 and FIG. 6, lighting apparatus 100 is downlight attached to ceiling 50 of a building. Lighting apparatus 100 includes light source device 20, lighting device 30, and power supply device 40. Light source device 20 and lighting device 30 are optically connected via optical fiber 23. Light source device 20 and power supply device 40 are electrically connected via power supply cable 24.

Lighting apparatus 100 is mounted on ceiling 50 in a state in which lighting device 30 is inserted into opening 51 of ceiling 50. In other words, lighting apparatus 100 is disposed in the ceiling space except for part of lighting device 30.

[Light Source Device]

Next, the following describes light source device 20 in detail. Light source device 20 uses laser light source 21 that emits blue laser light and wavelength conversion device 10 in combination to emit white light. In other words, light source device 20 emits white light including excitation light (blue laser light), fluorescent light emitted by first phosphors 12b, and fluorescent light emitted by second phosphors 12c. Light source device 20 includes laser light source 21, heat sink 22, optical fiber 23, power supply cable 24, and wavelength conversion device 10.

Laser light source 21 is an example of an excitation light source that emits excitation light. Laser light source 21 is, for example, a semiconductor laser that emits blue laser light. Laser light source 21 has an emission peak wavelength (emission center wavelength) of, for example, as least 440 nm and at most 470 nm. Laser light source 21 may emit blue-violet light or ultraviolet light. Specifically, laser light source 21 is a CAN package element, but may be a chip-type element.

Heat sink 22 is a structure that dissipates heat of laser light source 21 currently emitting light. Heat sink 22 houses laser light source 21, and functions as an outer case of light source device 20. Heat sink 22 is capable of dissipating the heat generated by laser light, source 21. Heat sink 22 is made of, for example, a metal having a relatively high thermal conductivity, such as aluminum or copper.

Optical fiber 23 guides laser light emitted by laser light source 21 to the outside of heat sink 22. Optical fiber 23 has an entrance disposed inside heat sink 22. The laser light emitted by laser light source 21 enters the entrance of optical fiber 23. Optical fiber 23 has an exit disposed inside lighting device 30. The laser light exiting through the exit is emitted to wavelength conversion device 10 disposed inside lighting device 30.

Power supply cable 24 is a cable for supplying power supplied from power supply device 40, to light source device 20. Power supply cable 24 has one end connected to a power circuit in power supply device 40, and the other end connected to laser light source 21 through an opening provided to heat sink 22.

[Lighting Device]

Next, the following describes lighting device 30. Lighting device 30 is fitted to opening 51, converts a wavelength of laser light guided by optical fiber 23, and emits light of a predetermined color. Lighting device 30 includes case 31, holder 32, and lens 33.

Case 31 is a bottomed cylindrical part that has an opening on the 7 axis positive side and houses holder 32, wavelength conversion device 10, and lens 33. Case 31 has the outer diameter slightly smaller than the diameter of opening 51, and is fitted to opening 51. More specifically, case 31 is fixed to opening 51 with an attaching spring (not shown). Case 31 is made of, for example, a metal having a relatively high thermal conductivity, such as aluminum or copper.

Holder 32 is a columnar part that holds optical fiber 23 and is partially housed by case 31. Holder 32 is disposed in an upper portion of case 31. Optical fiber 23 is held in a state in which optical fiber 23 is inserted into a through hole provided along the central axis of holder 32. Holder 32 holds optical fiber 23 so that the exit of optical fiber 23 turns to the Z axis positive side (a side facing wavelength conversion device 10). Holder 32 is made of, for example, aluminum or copper, but may be made of resin.

Lens 33 is an optical element that is disposed at an exit of case 31 and controls a distribution of light emitted from wavelength conversion device 10. Lens 33 is an example of an optical element that condenses or diffuses white light emitted from light source device 20 (wavelength conversion device 10). A surface of lens 33 opposite to wavelength conversion device 10 is shaped to take in light emitted from wavelength conversion device 10 inside lens 33 without leaking the light as much as possible.

[Power Supply Device]

Next, the following describes power supply device 40. Power supply device. 40 is a device that supplies power to light source device 20 (laser light source 21). Power supply device 40 houses the power circuit. The power circuit generates power for causing light source device 20 to emit light, and supplies the generated power to lighting device 30 via power supply cable 24. Specifically, the power circuit is an AC-DC conversion circuit that converts AC power supplied from a power system into DC power, and outputs the DC power. As a result, DC current is supplied to laser light source 21.

(Advantageous Effects Etc. of Embodiment 2)

As described above, light source device 20 includes: wavelength conversion device 10; and laser light source 21 that emits the excitation light. Light source device 20 emits white light including the excitation light, the fluorescent light emitted by first phosphor 12b, and the fluorescent light emitted by second phosphor 12c. Laser light source 21 is an example of an excitation light source.

Such light source device 20 makes it possible to reduce the influence of a variation in emission peak wavelength of the excitation light on chromaticity of the white light emitted from wavelength conversion device 10.

Moreover, lighting apparatus 100 includes: light source device 20; and lens 33 that condenses or diffuses the white light emitted from light source device 20. Lens 33 is an example of an optical element.

Such lighting apparatus 10 makes it possible to reduce the influence of the variation in emission peak wavelength of the excitation light on the chromaticity of the white light emitted from wavelength conversion device 10.

Embodiment 3

Figure 7:
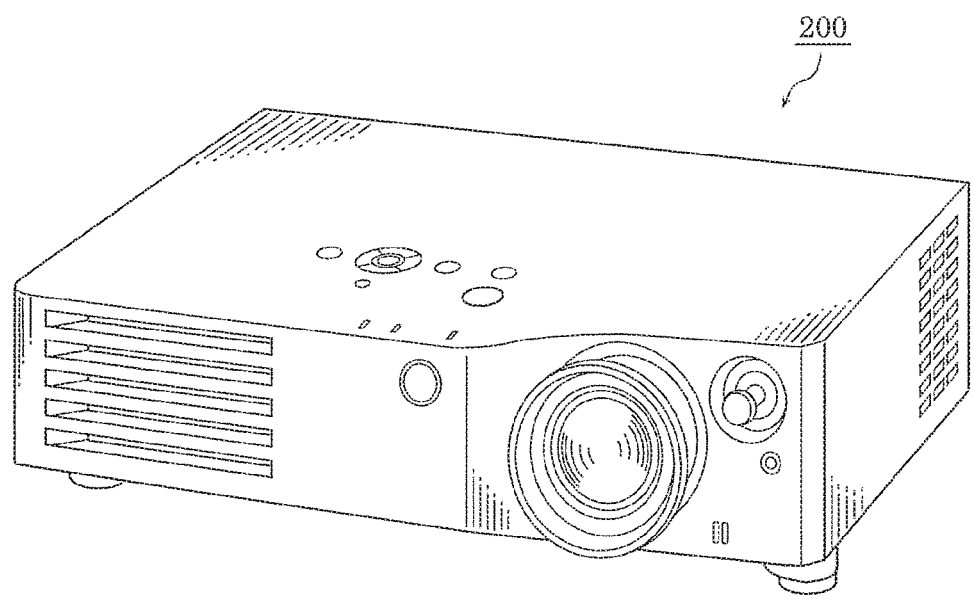
FIG. 7 is an external perspective view of a projection image display apparatus according to Embodiment 3.
Figure 8:
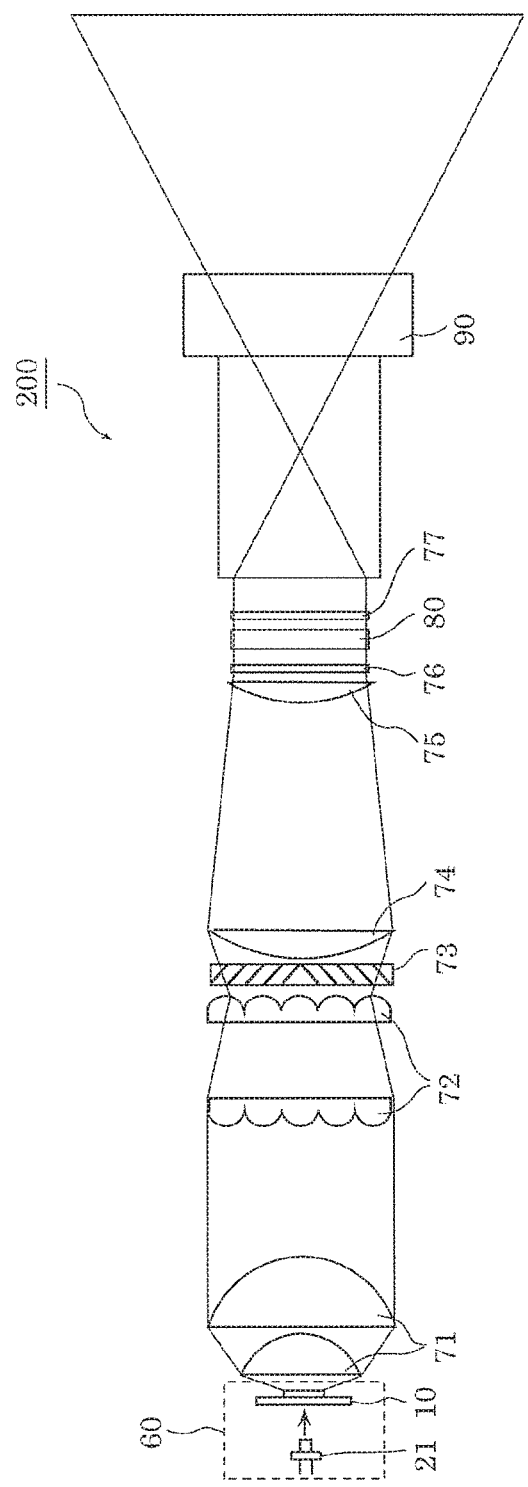
FIG. 8 is a diagram illustrating an optical system of the projection image display apparatus according to Embodiment 3.

In Embodiment 3, a light source device including wavelength conversion device 10, and a projection image display apparatus including the light source device will be described. FIG. 7, is an external perspective view of the projection image display apparatus according to Embodiment 3. FIG. 8 is a diagram illustrating an optical system of the projection image display apparatus according to Embodiment 3.

As illustrated in FIG. 7 and FIG. 8, projection image display apparatus 200 is a single-panel projector. Projection image display apparatus 200 includes light source device 60, collimator lens 71, integrator lens 72, polarization beam splitter 73, condenser lens 74, and collimator lens 75. In addition, projection image display apparatus 200 includes entrance polarization element 76, imaging element 80, exit-side polarization element 77, and projector lens 90.

Light source device 60 emits white light including excitation light (blue laser light), fluorescent light emitted by first phosphors 12b, and fluorescent light emitted by second phosphors 12c. Specifically, light source device 60 includes laser light source 21 and wavelength conversion device 10.

Collimator lens 71 collimates the white light emitted by light source device 60, and integrator lens 72 homogenizes an intensity distribution. Subsequently, polarization beam splitter 73 converts light whose intensity distribution is homogenized into linearly polarized light. Here, the light whose intensity distribution is homogenized is converted into, for example, p-polarized light.

The p-polarized light enters condenser lens 74 is further collimated by collimator lens 75, and enters entrance-side polarization element 76.

Entrance-side polarization element 76 is a polarizing plate (polarization control element) that polarizes light entering imaging element 80. Exit-side polarization element 77 is a polarizing plate that polarizes light exiting imaging element 80. Imaging element 80 is disposed between entrance-side polarization element 76 and exit-side polarization element 77.

Imaging element 80 is a substantially flat element that spatially modules the white light emitted from light source device 60, and outputs the spatially modulated white light as an image. In other words, imaging element 80 generates light for image. Specifically, imaging element 80 is a transmissive liquid crystal panel.

A polarization control region of exit-entrance polarization element 77 is configured to transmit the p-polarized light, and thus the light entering entrance-side polarization element 76 enters imaging element 80, is modulated by imaging element 80, and exits imaging element 80. Moreover, unlike entrance-side polarization element 76, exit-side polarization element 77 is configured to transmit only s-polarized light. Accordingly, only the components of the s-polarized light included in the modulated light pass the polarization control region of exit-side polarization element 77, and enter projector lens 90.

Projector lens 90 projects the image outputted by imaging element 80. As a result, the image is projected onto a screen etc.

(Advantageous Effects Etc. of Embodiment 3)

As described above, projection image display apparatus 200 includes light source device 60; imaging element 80 that modulates the white light emitted from light source device 60, and outputs, as an image, the white light modulated; and projector lens 90 that projects the image outputted by imaging element 80.

Such projection image display apparatus 200 makes it possible to reduce the influence of the variation in emission peak wavelength of the excitation light on the chromaticity of the white light emitted from wavelength conversion device 10.

It should be noted that the optical system of projection image display apparatus 200 described in Embodiment 3 is an example. For example, imaging element 80 may be a reflective imaging element such as a digital micromirror device (DMD) or a reflective liquid crystal panel. In addition, projection image display apparatus 200 may include a three-plate optical system.

Other Embodiments

Although Embodiments 1 to 3 are described above, the present disclosure is not limited to the aforementioned embodiments.

For example, although the laser light source is described as a semiconductor laser in the aforementioned embodiments, the laser light source may be a laser other than the semiconductor laser. The laser light source may be, for example, a solid-state laser such as a YAG laser, a liquid laser such as a dye laser, or a gas laser such as an Ar ion laser, a He—Cd laser, a nitrogen laser, and an excimer laser. Moreover, the light source device may include laser light sources. In addition, the light source device may include, as the excitation light source, a solid-state light-emitting element other than the semiconductor laser, such as an LED light source, an organic electroluminescent (EL) element, or an inorganic EL element.

While the foregoing has described one or more embodiments and/or other examples, it is understood that various modifications may be made therein and that the subject matter disclosed herein may be implemented in various forms and examples, and that they may be applied in numerous applications, only some of which have been described herein. It is intended by the following claims to claim any and all modifications and variations that fall within the true scope of the present teachings.

What is claimed is:

1. A light source device, comprising:
a wavelength conversion device; and
an excitation light source that emits excitation light,
wherein the wavelength conversion device includes:
　a substrate; and
　a phosphor layer on the substrate,
the phosphor layer includes:
　a base material; and
　a first phosphor and a second phosphor each of which emits fluorescent light when excited by the excitation light emitted by the excitation light source, wherein:
　where chromaticity coordinates of the fluorescent light emitted by the first phosphor and chromaticity coordinates of the fluorescent light emitted by the second phosphor are (x1, y1) and (x2, y2), respectively, $-0.003 \leq x1-x2 \leq 0.003$ and $-0.003 \leq y1-y2 \leq 0.003$ are satisfied,
a peak wavelength of an excitation spectrum of the first phosphor is different from a peak wavelength of an excitation spectrum of the second phosphor,
the peak wavelength of the excitation spectrum of the first phosphor is longer than an emission peak wavelength of the excitation light, and
the peak wavelength of the excitation spectrum of the second phosphor is shorter than the emission peak wavelength of the excitation light.

2. The light source device according to claim 1, wherein the peak wavelength of the excitation spectrum of the first phosphor is different from the peak wavelength of the excitation spectrum of the second phosphor by at least 3 nm.

3. The light source device according to claim 1, wherein each of the first phosphor and the second phosphor emits yellow fluorescent light.

4. The light source device according to claim 1, wherein each of the first phosphor and the second phosphor emits green fluorescent light.

5. The light source device according to claim 1, wherein each of the first phosphor and the second phosphor emits red fluorescent light.

6. The light source device according to claim 1, wherein one of the first phosphor and the second phosphor is a YAG phosphor, and another of the first phosphor and the second phosphor is a LuAG phosphor.

7. The light source device according to claim 1, wherein the first phosphor and the second phosphor are both a YAG phosphor and differ in a composition of one of a substitution element and an activator material.

8. The light source device according to claim 1, wherein the first phosphor and the second phosphor are both a LuAG phosphor, and differ in a composition of one of a substitution element and an activator material.

9. The light source device according to claim 1, wherein the phosphor layer includes the first phosphor and the second phosphor in a volume of at least 30 vol % relative to the base material.

10. A lighting apparatus, comprising: the light source device according to claim 1; and an optical element that condenses or diffuses the white light emitted from the light source device.

11. A projection image display apparatus, comprising: the light source device according to claim 1; an imaging element that modulates white light emitted from the light source device, and outputs, as an image, the white light modulated; and a projector lens that projects the image outputted by the imaging element.

* * * * *